United States Patent Office 3,511,867
Patented May 12, 1970

---

3,511,867
N-SUBSTITUTED DITHIOCARBAMATES OF SUBSTITUTED 3 - AMINO-2-CYANO-3-THIOACRYLIC ACID ESTERS
Real Laliberte, Laval, Quebec, and Hilda M. Warwick, Montreal, Quebec, Canada, assignors to American Home Products Corporation, New York, N.Y., a corporation of Delaware
No Drawing. Filed May 15, 1967, Ser. No. 638,599
Int. Cl. C07c *121/38, 155/08;* A61k *127/00*
U.S. Cl. 260—455                                      3 Claims

---

ABSTRACT OF THE DISCLOSURE

There are disclosed herein the N-(lower alkyl)-dithiocarbamates of 3-(substituted amino) - 2 - cyano - 3 - thio acrylic acid methyl and ethyl esters, in which the substituent on the 3-amino group is a lower alkyl group containing from 1–6 carbon atoms and the allyl group. The compounds have anti-inflammatory and anti-fungal activities, and methods for their preparation and use are also given.

---

This invention relates to N-substituted dithiocarbamates of substituted 3-amino-2-cyano-3-thioacrylic acid esters of the Formula I

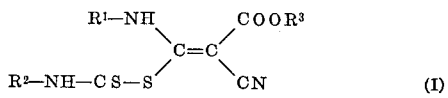

in which $R^1$ represents a lower alkyl group containing from 1–6 carbon atoms, $R^2$ represents the same or a different lower alkyl group containing from 1–6 carbon atoms or the allyl group, and $R^3$ represents a lower alkyl group containing from 1–2 carbon atoms.

The compounds of this invention possess anti-inflammatory activities and are useful as anti-inflammatory agents. For that purpose they may be formulated with excipients such as starch, lactose, magnesium stearate, or magnesium silicate in the form of tablets or capsules for oral administration containing from 50–250 mg. each of the active ingredient, and may be administered in divided doses up to 400–500 mg. per day as required.

The compounds of this invention are also active in inhibiting growth of certain pathogenic fungi such as, for example, *Candida albicans*, *Trichophyton granulosum*, and *Microsporum gypsum*. They are useful as anti-fungal agents and may be formulated with suitable excipients in the form of solutions, creams, or lotions for topical administration containing from 0.1–1.0 percent of the active ingredient, to be administered topically to infected areas of the skin as required.

More specifically, the compounds of this invention are prepared by reacting molar equivalents of a suitable isothiocyanate of the formula $R^1NCS$ (II) with a lower alkyl cyanoacetate, preferably ethyl cyanoacetate, of the formula $NC-CH_2-COOR^3$ (III) in the presence of an alkali metal lower alkoxide, preferably sodium ethoxide. The resultant intermediate alkali metal salt of Formula IV may be reacted with one molar equivalent of another isothiocyanate of the formula $R^2NCS$ to yield, under acidic reaction conditions, the desired compounds of Formula I in which $R^1$ and $R^2$ represent different substituents.

Alternatively, if it is desired to obtain compounds of Formula I in which $R^1$ and $R^2$ represent the same substituent, two molar equivalents of an isothiocyanate of the Formula II are reacted with the cyanoacetate of Formula III in the presence of an alkali metal lower alkoxide. The intermediate of Formula IV is not isolated and is reacted under acidic conditions with the excess isothiocyanate left in the reaction mixture, to yield the compounds of Formula I in which $R^1$ and $R^2$ represent the same substituent.

The following examples and formulae, in which $R^1$, $R^2$, and $R^3$ are as defined above, will illustrate this invention.

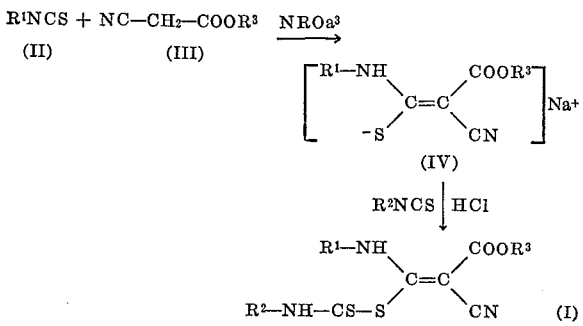

EXAMPLE 1

Ethyl cyanoacetate (0.1 mole, 11.3 g.) and methyl isothiocyanate (0.2 mole, 14.6 g.) are added successively to a cooled solution of 2.3 g. of sodium in 60 ml. of ethanol. A yellow colour and heat are produced. After standing at room temperature for 1 hour, the reaction mixture is poured into 50 ml. of water, acidified to pH 1 with dilute hydrochloric acid, and left in the cold over night, to yield colourless crystals of the N-methyldithiocarbamate of 2-cyano-3 - methylamino - 3 - thioacrylic acid ethyl ester, M.P. 104–105° C. after crystallisation from ethanol.

In the same manner, but using ethyl, propyl, butyl, pentyl, or hexyl isothiocyanate instead of methyl isothiocyanate, the corresponding N-ethyl-, N-propyl-, N-butyl, N-pentyl-, and N - hexyl - dithiocarbamates of 3 - ethylamino-, 3-propylamino-, 3-butylamino-, 3-pentylamino-, and 3-hexylamino-2-cyano-3-thioacrylic acid ethyl ester are obtained.

EXAMPLE 2

Methyl isothiocyanate (0.1 mole, 7.3 g.) and ethyl cyanoacetate (0.1 mole, 11.3 g.) are added successively to a cooled solution of sodium (2.3 g.) in 30.0 ml. of ethanol. A yellow colour and heat are produced. After standing at room temperature for ½ hour, the solvent is removed by evaporation under reduced pressure, the resulting solid is dissolved in 25.0 ml. of water and acidified with dilute hydrochloric acid to yield an oil which crystallizes in the cold. Recrystallisation from methanol-water, or benzene-petroleum ether, yields 2-cyano-3-mercapto-3-methylaminoacrylic acid ethyl ester, M.P. 51–52° C.

In the same manner, but using ethyl, propyl, butyl, pentyl, or hexyl isothiocyanate instead of methyl isothiocyanate, the corresponding 3-ethylamino- 3-propylamino-, 3-butylamino-, 3-pentylamino-, and 3-hexylamino-2-cyano-3-mercaptoacrylic acid ethyl esters are also obtained.

EXAMPLE 3

Allyl isothiocyanate (0.5 g.) is added to a solution of 1.0 g. 2-cyano-3-mercapto-3-methylaminoacrylic acid ethyl ester, obtained as described in Example 2, in a minimum of ethanol, and the resulting reaction mixture made acid to pH 1 with dilute hydrochloric acid and placed in the cold overnight. The crystalline product is filtered and recrystallised from benzene to yield the N-allyldithiocarbamate of 2-cyano-3-methylamino-3-thioacrylic acid ethyl ester, M.P. 89–90° C.

In the same manner, but using 3-ethylamino-, 3-propylamino-, 3-butylamino-, 3-pentylamino-, or 3-hexylamino- 2-cyano-3-mercaptoacrylic acid ethyl esters as starting materials and proceeding as above, the corresponding N-allyldithiocarbamates of 3-ethylamino-, 3-propylamino-, 3 - butylamino-, 3-pentylamino-, and 3-hexylamino-2-cyano-3-thiocrylic acid ethyl esters are respectively obtained.

In the same manner, but using as starting materials 3-methylamino-, 3-ethylamino-, 3-propylamino-, 3-butylamino-, 3-pentylamino-, or 3-hexylamino-2-cyano-3-mercaptoacrylic acid ethyl esters, and reacting them with methyl, ethyl, propyl, butyl, pentyl, or hexyl isothiocyanate, there are obtained the N-methyl-, N-ethyl-, N-propyl-, N-butyl-, N-pentyl-, and N-hexyldithiocarbamates of 3-methylamino-, 3-ethylamino-, 3-propylamino-, 3-butylamino-, 3-pentylamino-, and 3-hexylamino-2-cyano-3-thioacrylic acid ethyl esters.

We claim:
1. Compounds of the formula

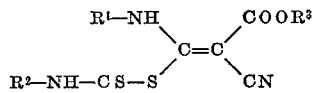

wherein $R^1$ represents lower alkyl; $R^2$ is selected from the group which consists of lower alkyl and allyl; and $R^3$ is selected from the group which consists of methyl and ethyl.

2. N - methyldithiocarbamate of 2 - cyano-3-methylamino-3-thioacrylic acid ethyl ester, as claimed in claim 1.

3. N - allyldithiocarbamate of 2 - cyano - 3 - methylamino-3-thioacrylic acid ethyl ester, as claimed in claim 1.

References Cited

UNITED STATES PATENTS 3,238,239  3/1966  Schweckendick et al. __ 260—455

CHARLES B. PARKER, Primary Examiner

D. R. PHILLIPS, Assistant Examiner

U.S. Cl. X.R.

260—465.4; 424—300